United States Patent
Ekl et al.

(10) Patent No.: US 7,876,706 B2
(45) Date of Patent: Jan. 25, 2011

(54) METHOD AND APPARATUS FOR ROOT NODE SELECTION IN AN AD HOC NETWORK

(75) Inventors: Randy L. Ekl, Lake Zurich, IL (US); Mark J. Johnson, Cary, IL (US); Anthony R. Metke, Naperville, IL (US); Aparna Pandey, Chicago, IL (US); Joseph E. Phillips, Huntley, IL (US); Christopher G. Ware, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1291 days.

(21) Appl. No.: 11/363,757

(22) Filed: Feb. 28, 2006

(65) Prior Publication Data

US 2007/0201381 A1   Aug. 30, 2007

(51) Int. Cl.
*H04L 12/28* (2006.01)
(52) U.S. Cl. .................................................... 370/254
(58) Field of Classification Search ............. 379/201.01, 379/201.06; 370/254, 255, 351, 357, 360, 370/384, 385, 389, 395.1, 395.5
See application file for complete search history.

(56) References Cited

U.S. PATENT DOCUMENTS

| | | | |
|---|---|---|---|
| 5,544,150 A | 8/1996 | Fujimoto | |
| 6,134,599 A | 10/2000 | Chiu | |
| 6,292,508 B1 * | 9/2001 | Hong et al. | 375/134 |
| 6,466,983 B1 * | 10/2002 | Strazza | 709/227 |
| 6,493,759 B1 | 12/2002 | Passman | |
| 6,829,222 B2 | 12/2004 | Amis | |
| 7,154,854 B1 * | 12/2006 | Zweig et al. | 370/236 |
| 7,342,896 B2 * | 3/2008 | Ayyagari | 370/254 |
| 7,372,832 B2 * | 5/2008 | Bevan et al. | 370/329 |
| 7,502,360 B2 | 3/2009 | Liu | |
| 7,593,376 B2 * | 9/2009 | D'Amico et al. | 370/338 |
| 2002/0044549 A1 | 4/2002 | Johansson | |
| 2003/0041138 A1 | 2/2003 | Kampe et al. | |
| 2003/0202468 A1 * | 10/2003 | Cain et al. | 370/229 |
| 2003/0214921 A1 | 11/2003 | Alapuranen | |
| 2004/0174829 A1 | 9/2004 | Ayyagari | |
| 2005/0055418 A1 | 3/2005 | Blanc | |
| 2005/0094574 A1 | 5/2005 | Han | |

(Continued)

OTHER PUBLICATIONS

US Supplmental Response for Related U.S. Appl. No. 11/363,756 filed Apr. 9, 2009.

(Continued)

*Primary Examiner*—Chi H Pham
*Assistant Examiner*—Fan Ng
(74) *Attorney, Agent, or Firm*—Randi L. Karpinia

(57) ABSTRACT

Techniques are provided for selecting a root node in an ad hoc network comprising a plurality of nodes including a first node. According to one implementation of these techniques, a first node can receive a message from at least one of the other nodes. Each message includes a number of primary factors associated with a particular node regarding capabilities of the particular node. The primary factors associated with each node can then be evaluated, and an attempt can be made to select the root node based on the primary factors associated with each node. If the first node is unable to select the root node based on the primary factors associated with each node, then the root node can be selected based on secondary factors associated with each node.

28 Claims, 8 Drawing Sheets

U.S. PATENT DOCUMENTS

| | | |
|---|---|---|
| 2005/0138517 A1 | 6/2005 | Monitzer |
| 2006/0039371 A1* | 2/2006 | Castro et al. ............... 370/389 |
| 2006/0092942 A1 | 5/2006 | Newson et al. |
| 2006/0140135 A1* | 6/2006 | Bonta et al. ............... 370/254 |
| 2006/0215588 A1* | 9/2006 | Yoon ........................ 370/310 |
| 2007/0201382 A1 | 8/2007 | Ekl et al. |
| 2007/0204021 A1 | 8/2007 | Ekl et al. |
| 2008/0144552 A1* | 6/2008 | Johansson et al. .......... 370/310 |

OTHER PUBLICATIONS

Office Action Dated Nov. 18, 2008 for Related U.S. Appl. No. 11/363,756.

Amendment for Related U.S. Appl. No. 11/363,756 filed Mar. 18, 2009.

Office Action Dated Jan. 22, 2009 for Related U.S. Appl. No. 11/363,778.

Amendment for Related U.S. Appl. No. 11/363,778 filed Apr. 20, 2009.

Office Action Dated Jul. 9, 2009 for Related U.S. Appl. No. 11/363,778.

Office Action Dated Jun. 4, 2009 for Related U.S. Appl. No. 11/363,756.

USPTO Office Action Dated Oct. 2, 2009 for U.S. Appl. No. 11/363,756.

* cited by examiner

METHOD AND APPARATUS FOR ROOT NODE SELECTION IN AN AD HOC NETWORK

FIELD OF THE INVENTION

The present invention relates generally to wireless communications and more particularly to techniques for designating, identifying and/or selecting a root node in a mobile ad hoc network.

BACKGROUND

Wireless networks have experienced increased development in the past decade. Two types of wireless networks are infrastructure-based wireless networks, and ad hoc wireless networks.

An infrastructure-based wireless network typically includes a communication network with fixed and wired gateways. Many infrastructure-based wireless networks employ a mobile unit which communicates with a fixed base station that is coupled to a wired network. The mobile unit can move geographically while it is communicating over a wireless link to the fixed base station. When the mobile unit moves out of range of one base station, it may connect or perform a "handover" to a new base station and continue communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network can, for example, refer to a local area network (LAN) or other small network, especially one with wireless or temporary plug-in connections, in which some of the network devices are part of the network only for the duration of a communications session or, in the case of mobile or portable devices, while in some close proximity to the rest of the network. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

Each node can typically directly communicate over a short range with nodes (sometimes referred to as "neighbor nodes.") which are a single "hop" away. When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. As used herein, "a router" could be either a layer 2 or a layer 3 device, (e.g., generic routing functionality), not specific to an Internet Protocol (IP) implementation or a specific Media Access Control (MAC) implementation. Layer 2 refers to the data link layer of the Open Systems Interconnection (OSI) communication model. The data link layer is concerned with moving data across the physical links in the network. In the context of the IEEE-802 LAN standards, the data link layer contains two sublayers called the Media Access Control (MAC) sublayer and the Logical Link Control (LLC) sublayer. The data link layer ensures that an initial connection has been set up, divides output data into data frames, and handles the acknowledgements from a receiver that the data arrived successfully. The data link layer also ensures that incoming data has been received successfully by analyzing bit patterns at special places in the frames. In a local area network (LAN) or other network, the Media Access Control (MAC) address is a host computer's unique hardware number. On an Ethernet LAN, the MAC address is an Ethernet address. When a computer or other host connects to the Internet, a correspondence table relates the hosts IP address to the host's physical (MAC) address on the LAN. The MAC address is used by the Media Access Control sublayer of the Data-Link Layer (DLL) of telecommunication protocols. There is a different MAC sublayer for each physical device type. Layer 3 refers to the network layer of the Open Systems Interconnection (OSI) multilayered communication model. The network layer is concerned with knowing the address of the neighboring nodes in the network, selecting routes and quality of service, and recognizing and forwarding to the transport layer incoming messages for local host domains.

To assist with relaying of packets, each node may maintain routes or routing information to other nodes in the network and can utilize routing techniques to adapt to changes in the interconnectivity between nodes. The nodes can maintain this routing information by performing periodic link and topology updates. Alternatively, nodes may discover routing information only when needed, instead of utilizing updates to maintain routes.

To centralize control some ad hoc networks manually configure one of the nodes as a "root" node. In some cases, the node which is configured as the root node may be one which is directly connected to infrastructure or a wired network. The root node acts as a centralized point of control in such ad hoc networks. Among other functions, the root node can direct requests (e.g., control information) and data traffic to appropriate nodes in the network. One drawback associated with defining or pre-configuring a specific node as the root node is that the root node may not be in an optimal location within the ad hoc network. This can unnecessarily increase messaging as well as delay responses. Moreover, if the root node looses connectivity, then the functionality provided by that root node is lost.

Notwithstanding these advances, there is a need for improved techniques for designating, identifying and/or selecting a root node in an ad hoc network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
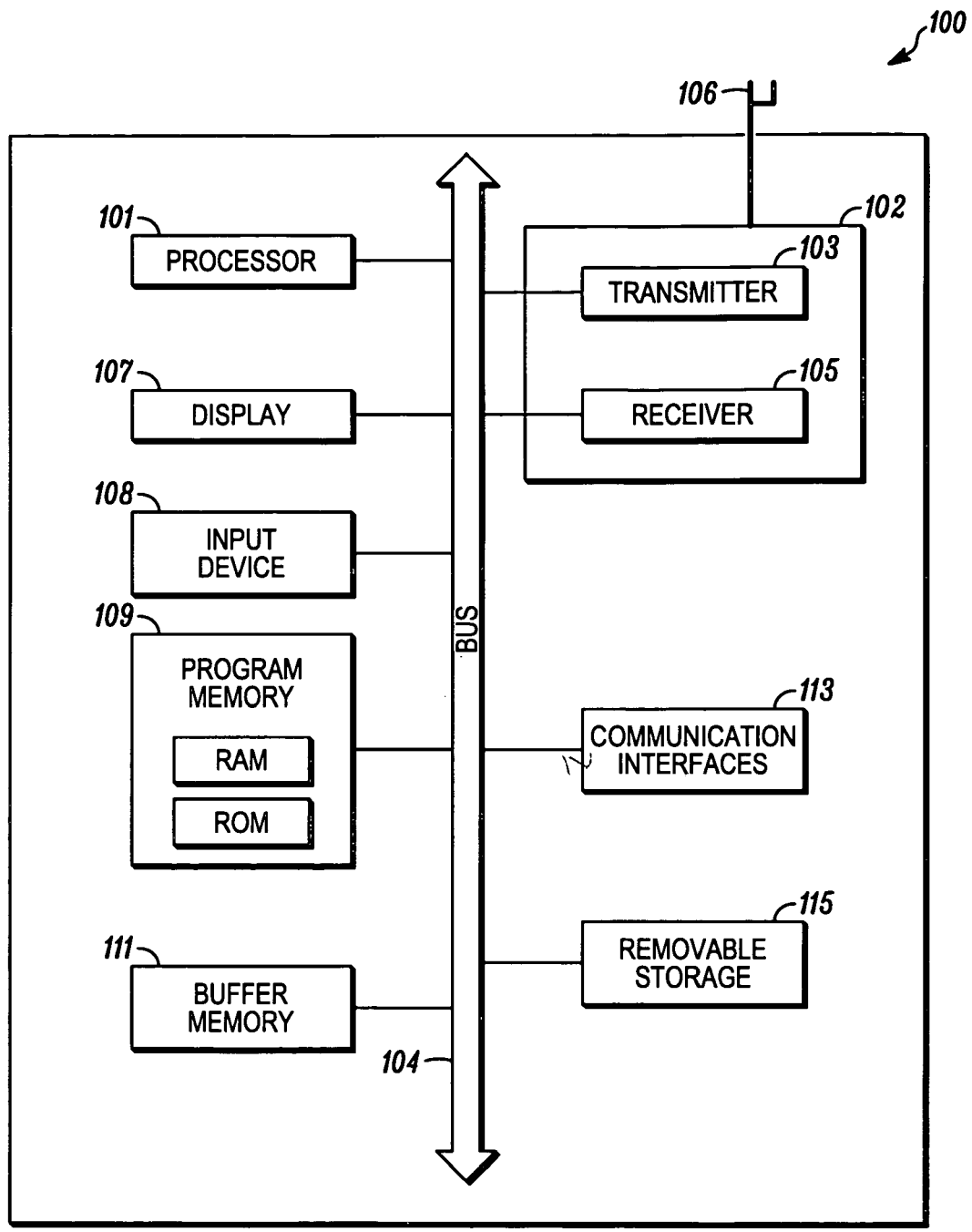
FIG. 1 is a block diagram of an exemplary node in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the selection of a root node in an ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for selecting of a root node described herein. The non-processor circuits may include, but are not limited to, a radio receiver, a radio transmitter, signal drivers, clock circuits, power source circuits, and user input devices. As such, these functions may be interpreted as steps of a method for selecting of a root node. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The disclosed embodiments relate to root node selection techniques for dynamically determining and/or selecting a root node in an ad hoc network. These techniques can allow a root node to be dynamically selected taking into account, for example, static and dynamic capabilities and characteristics of the nodes in the ad hoc network and the topology of those nodes in the ad hoc network. As used here, a "root" node refers to a node which offers services or directs other nodes to offered services in the system. Among other functions, the root node can perform Dynamic Host Configuration Protocol (DHCP) functions, security functions, Quality of Service (QoS) functions, call control functions, or any of a number of other functions that are typically performed by other entities. The root node can also indicate which other nodes in the system provide additional services.

According to the techniques of some embodiments of the present invention, a root node can be selected by a node or nodes based on the capabilities of each node. To determine which node should be selected as the root node, nodes can exchange messages with specific criteria/contents including static and dynamic factors which can allow a node or nodes to determine which node should be selected as a root node. In one implementation, root node selection techniques are provided which check for a better root node over the current root node. These root node selection techniques can be used to select a root node such that packets can be efficiently routed despite a dynamically changing topology. In addition, signaling messages can be decreased. These techniques can reduce excessive amounts of system traffic which can unnecessarily consume bandwidth. These techniques can also decrease the probability of channel congestion, overload and/or interference in the ad hoc network since these techniques allow for an optimal root node to be selected. As a result, the likelihood of packet collisions decreases.

FIG. 1 is a block diagram of an exemplary node 100 in accordance with some embodiments of the invention. The node 100 comprises a processor 101, a transceiver 102 including a transmitter circuitry 103 and a receiver circuitry 105, an antenna 106, a display 107, an input device 108, a program memory 109 for storing operating instructions that are executed by the processor 101, a buffer memory 111, one or more communication interfaces 113, and a removable storage 115. Although not shown, the node 100 also preferably includes an antenna switch, duplexer, circulator, or other highly isolative means (not shown) for intermittently providing information packets from the transmitter circuitry 103 to the antenna 106 and from the antenna 106 to the receiver circuitry 105. The node 100 is preferably an integrated unit containing at least all the elements depicted in FIG. 1, as well as any other elements necessary for the node 100 to perform its particular electronic function. Alternatively, the node 100 may comprise a collection of appropriately interconnected units or devices, wherein such units or devices perform functions that are equivalent to the functions performed by the elements of the node 100. For example, the node 100 may comprise a laptop computer and a wireless LAN (local area network) card.

The processor 101 preferably includes one or more microprocessors, microcontrollers, DSPs (digital signal processors), state machines, logic circuitry, or any other device or devices that process information based on operational or programming instructions. Such operational or programming instructions are preferably stored in the program memory 109. The program memory 109 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 101 has one or more of its functions performed by a state machine or logic circuitry, the memory 109 containing the corresponding operational instructions may be embedded within the state machine or logic circuitry. The operations performed by the processor 101 and the rest of the node 100 are described in detail below.

The transmitter circuitry 103 and the receiver circuitry 105 enable the node 100 to communicate information packets to and acquire information packets from the other nodes. In this regard, the transmitter circuitry 103 and the receiver circuitry 105 include appropriate, conventional circuitry to enable digital or analog transmissions over a wireless communication channel. The transmitter circuitry 103 and the receiver circuitry 105 can operate over an ad hoc networking air interface (e.g., BLUETOOTH, 802.11 WLAN, 802.15.3, 802.16, and the like).

The implementations of the transmitter circuitry 103 and the receiver circuitry 105 depend on the implementation of the node 100. For example, the transmitter circuitry 103 and the receiver circuitry 105 can be implemented as an appropriate wireless modem, or as conventional transmitting and receiving components of two-way wireless communication devices. In the event that the transmitter circuitry 103 and the receiver circuitry 105 are implemented as a wireless modem, the modem can be internal to the node 100 or insertable into the node 100 (e.g., embodied in a wireless radio frequency (RF) modem implemented on a Personal Computer Memory Card International Association (PCMCIA) card). For a wireless communication device, the transmitter circuitry 103 and the receiver circuitry 105 are preferably implemented as part of the wireless device hardware and software architecture in accordance with known techniques. One of ordinary skill in the art will recognize that most, if not all, of the functions of the transmitter circuitry 103 and/or the receiver circuitry 105 may be implemented in a processor, such as the processor 101. However, the processor 101, the transmitter circuitry 103, and the receiver circuitry 105 have been artificially partitioned herein to facilitate a better understanding.

The receiver circuitry 105 is capable of receiving RF signals from at least one band and optionally more bands, if the communications with the proximate device are in a frequency band other than that of the network communications. The receiver circuitry 105 may optionally comprise a first receiver and a second receiver, or one receiver capable of receiving in two or more bands. The receiver 105, depending on the mode of operation, may be tuned to receive, for example, Bluetooth or WLAN, such as 802.11, communication signals. The transceiver 102 includes at least one set of transmitter circuitry 103. The at least one transmitter 103 may be capable of transmitting to multiple devices potentially in multiple frequency bands.

The antenna 106 comprises any known or developed structure for radiating and receiving electromagnetic energy in the frequency range containing the wireless carrier frequencies.

The buffer memory 111 may be any form of volatile memory, such as RAM, and is used for temporarily storing received information packets in accordance with the present invention.

When the node 100 is constructed to receive video information from a video source, the node 100 preferably further includes a video decoder capable of decoding the current Moving Picture Experts Group (MPEG) standard or some other video decoding standard. When the node 100 is further capable of transmitting video information, the node 100 preferably further includes a video encoder capable of encoding the video data into at least one of the foregoing video standards. Such video encoder and decoder is preferably implemented as part of the processor 101.

Figure 2:
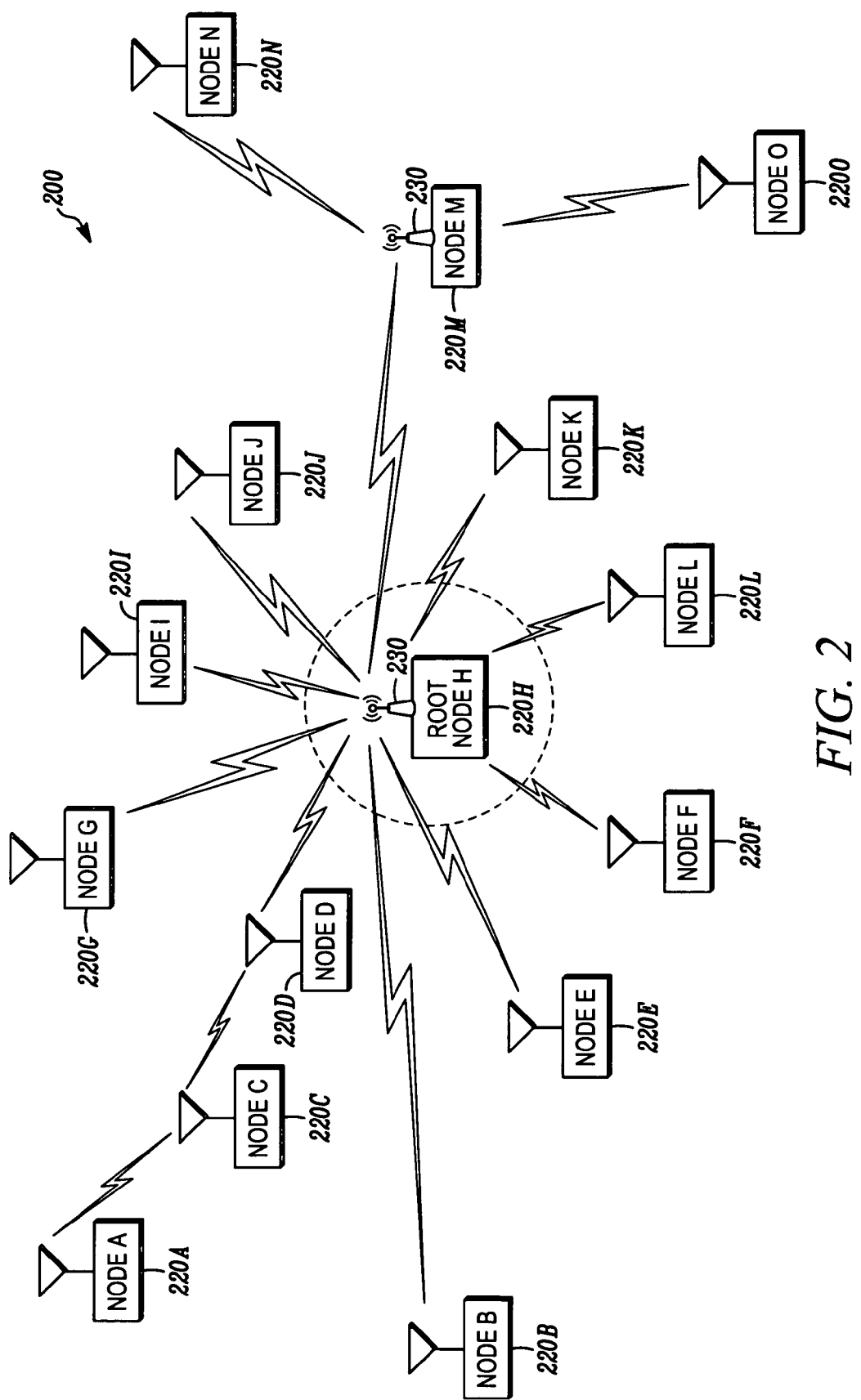
FIG. 2 is a block diagram of an exemplary ad hoc communication network.

FIG. 2 is a block diagram of an ad hoc communication network 200. The ad hoc communication network 200 comprises a plurality of nodes 220A-220O each having wireless repeater and routing capability and optionally a number of wired Access Points (APs) 230. In the exemplary network shown in FIG. 2 nodes 220H, 220M are wired Access Points (APs) 230.

The nodes 220A-220O can be wireless devices capable of transmitting and receiving packetized audio, video and/or data information. Some of the components in an exemplary node, such as a processor, transmitter, receiver and antenna, are described above in FIG. 1. A node can be fixed, stationary or mobile at any particular instant in time, and can include devices configured to communicate through a wireless channel or through a wired channel. A node can be embodied as any of a number of types of devices including but not limited to a personal computer (PC) having an external or internal wireless modem, a PC card, compact flash, a wireless communication device such as a cellular telephone or personal digital assistant (PDA). In one implementation, the wireless device comprises a mobile telephone which can also be called a mobile station (MS), mobile equipment (ME) or user equipment (UE).

The nodes 220A-220O can communicate information packets over wireless carrier frequencies, each of which includes one or more wireless communication channels depending on the multiple access scheme utilized in the network 200.

The access points 230 are typically, but not necessarily required to be, coupled to a wired network (not shown) and can provide one or more sources of audio, video and/or data information. The access points 230 may be a cellular base station, a wireless access point that complies with the IEEE 802.11 Standard or other wireless local area network (WLAN) Standards, a Bluetooth access point, or the like.

The ad hoc communication network 200 can implement routing intelligence, which is typically distributed among nodes 220A-220O to help improve overall network performance. In the ad hoc network 200, communications to or from nodes 220A-220O can "hop" through each other to reach other nodes 220A-220O in the network. In other words, nodes in close proximity can receive transmissions from nearby nodes utilizing the ad hoc air interface and relay these transmissions to other nodes, including access points or nodes with links to other wired or wireless networks.

In the example shown in FIG. 2, node 220H is initially designated as the current root node of the network 200 and is designated by a dashed-line circle. Once designated, the node 220H broadcasts a message throughout the ad hoc network 200 indicating that it is currently serving as the root node.

When access to a wired network is desired, communications from nodes 220A-G, I-L, N-O can hop to an AP 220 H, M (typically to the AP that is closest, but to an alternate AP if their current AP is congested or fails). It will be appreciated by those of ordinary skill in the art that while the ad hoc network 200 in FIG. 2 is shown as operating with wired APs 220 H, M, the ad hoc network 200 of FIG. 2 does not necessarily require any wired network to be present. Rather, the nodes 220A-G, I-L, N-O can support peer-to-peer communication without the need for wired infrastructure or other networks.

Although not shown in FIG. 2, it will be appreciated by those of ordinary skill in the art that the nodes 220A-220O, can also communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity driven multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

After initial deployment (FIG. 2), each node 220A-220O broadcasts a hello packet to its neighbor nodes. As used herein, a "hello packet" is a packet (message) that is sent out periodically from each node to establish and confirm network adjacency relationships. On networks capable of broadcast or multicast transmission, a hello packet can be sent from a node simultaneously to other nodes to discover neighboring nodes. Each node 220A-220O uses the hello packet received from their neighbor nodes to build an initial neighbor list that includes each of the node's neighbors. Thereafter, each node 220A-220O can advertise its presence by periodically broadcasting an advertisement or "hello" message. In turn, each node can identify its neighbor nodes, and maintain or update the neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 2, node 220H has ten neighbor nodes—nodes 220 B, D, E, F, G, I, J, K, L, M.

In some embodiments of the present invention, to allow adaptation to topology changes and to continuously optimize the network, the initial/current root node 220H can periodically or probabilistically renounce its status as a root node. For instance, in one implementation, to ensure fairness, the initial/current root node 220H can periodically renounce its root node status after a predetermined period of time by announcing expiration of its root node status to neighbor nodes. In one alternative implementation, each node in the network assumes that a new root node is to be selected when a predetermined amount of time elapses after receiving an announcement message, from the current root node, announcing its status as the root node. In yet another implementation, the initial/current root node 220H may probabilistically renounce its root node status based on changes in parameters in its status message such as its primary factors, its secondary factors and/or its aggregate weighted value. As used herein an "aggregate weighted value" is a single value representing a number of metrics relevant to a decision, where metrics considered more important to the decision affect the value more than those considered less important. Once a renouncement message transmitted by the initial/current root node 220H is received by other nodes, other nodes can attempt to select a new root node.

As noted above, in many cases the topology of the ad hoc network changes significantly over time.

Figure 3:
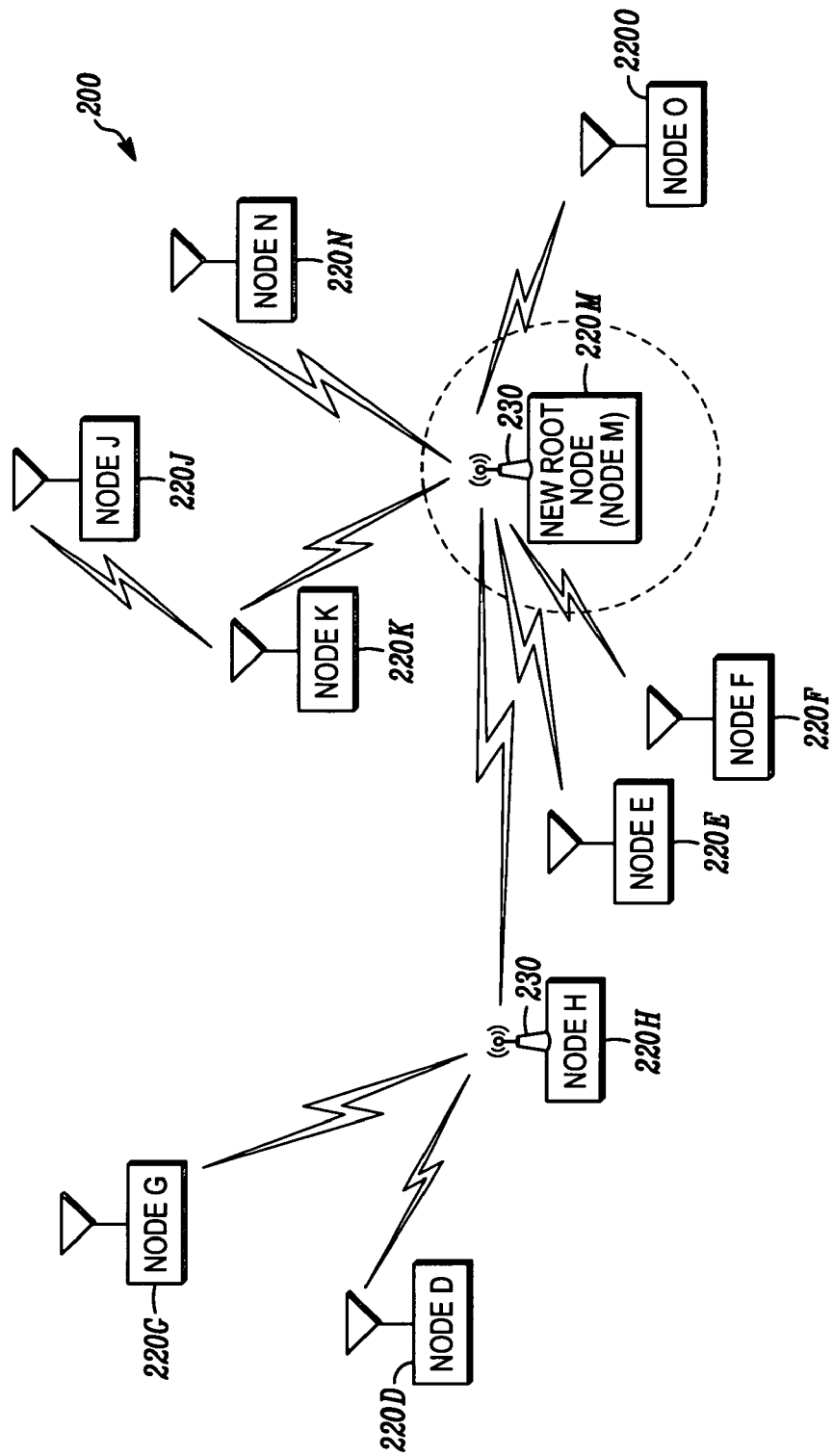
FIG. 3 is a block diagram of the exemplary ad hoc communication network of FIG. 2 after selection of a new root node.

FIG. 3 is a block diagram of the exemplary ad hoc communication network 200 of FIG. 2 after time has elapsed and a new root node 220M has been selected. In the example shown in FIGS. 2 and 3 only one root node is selected in the ad hoc network 200 at any given time. However, in a simplistic implementation, the number of nodes selected as root nodes can be greater than one depending on the network configuration at any given time, and an appropriate number of root nodes will be selected.

During the time which elapses between FIGS. 2 and 3, the topology of the network changes. Specifically, nodes 220 A-C, I, L have left the ad hoc network 200, nodes 220 D, G, N have remained stationary (e.g., have not moved or changed location), and nodes 200 E, F, J, K, O have moved or are moving.

As time elapses the initially selected root node 220H may no longer be the most desirable root. For example, a particular root node might relocate such that the network becomes fragmented or damaged to the point that some of the nodes in the network lose connectivity and are unable to receive message(s) from the root node 220H. Thus, at the particular time shown in FIG. 3, node 220M has been selected as a new root node of the network 200 and is designated by a dashed-line circle, while node 220H no longer serves as the root node.

In the example shown in FIG. 3, at least one of the root node selection techniques described below in FIGS. 4-8 can be used for dynamically determining and selecting a new root node 220 M (marked with a dashed circle). The node to be selected as the root node can be determined by one of a number of different techniques including, but not limited to, an omniscient root node selection technique (FIG. 6), a myopic root node selection technique (FIG. 7) and a hybrid omniscient/myopic root node selection technique (FIG. 8). In each of these techniques, status messages and/or specific information contained within the messages can be used to determine which node will be selected as the root node.

Figure 4:
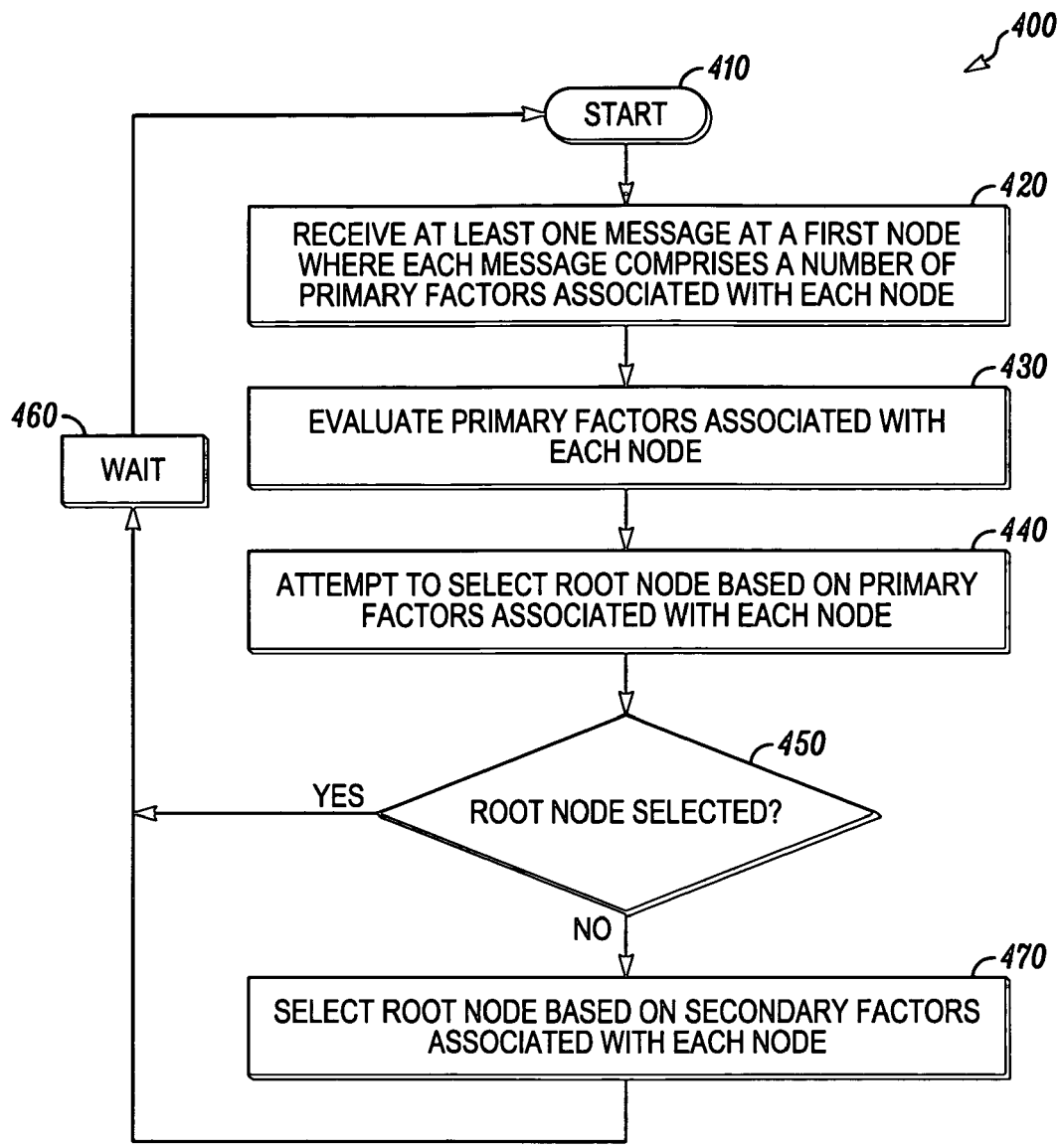
FIG. 4 is a flowchart showing an exemplary method for dynamically selecting a root node in an ad hoc network in accordance with some embodiments of the invention.

FIG. 4 is a flowchart showing an exemplary method 400 for dynamically selecting a root node in an ad hoc network in accordance with some embodiments of the invention. While method 400 could be applied to the ad hoc network 200 shown in FIG. 2, it will be appreciated that the method 400 could be applied to other ad hoc network configurations which vary from the specific example shown in FIG. 2. If there is only one node in the ad hoc network, then this node will be the root node. In most cases the ad hoc network 200 will generally include a plurality of nodes. In situations where the ad hoc network 200 includes a plurality of nodes, the root node can be selected by a node or nodes based on the capabilities of nodes in the ad hoc network 200.

Each node 220A-220O monitors its status within the ad hoc network 200 and collects status information about its relative status with respect to other nodes in the ad hoc network 200. At least some of the nodes 220A-220O can use this status information to generate a "status" message, and transmits the "status" message to other nodes in its vicinity (e.g., its neighbor nodes in the network which are within its range or other nodes in the vicinity of the node which are not on the neighbor list but have come within transmission range of the node).

In one implementation, prior to step 410, each of the nodes which decides to nominate itself as a root node candidate can transmit its status message to other nodes in the network (not shown). Each node in the ad hoc network can nominate itself as a candidate node by transmitting/broadcasting a status message.

In other implementations, each of a subset of the nodes (or possibly all of the nodes) decides whether or not to nominate itself as a root candidate. For example a node can decide to nominate itself as a root candidate depending on the relative likelihood of that node being selected as a root node. For instance, each of the nodes can evaluate certain primary factors, secondary factors and/or an aggregate weighted value associated with each node, and based on the evaluation decide whether or not to nominate itself as a root node candidate. For example, prior to step 410, at least some (or possibly all) of the nodes can decide to nominate themselves as root node candidates based on a certain parameters (such as selected status information, primary factors, secondary factors and/or the aggregate weighted value) associated with the node. In these implementations, at step 410, only the nodes which decide to nominate themselves can then transmit a status message. Thus, in these implementations, only certain nodes decide to transmit/broadcast a status message to nominate themselves as candidate root nodes. In other implementations, a node can nominate itself only if its metrics are potentially better than any node which has already nominated itself.

Referring now to FIG. 4, the process starts at step 410, where at least one node (or alternatively some or all of the nodes) in the network can transmit or broadcast a status message to other nodes in its proximity to advertise its capabilities to the other nodes. The status messages can be exchanged between the nodes to facilitate root node selection. The "status" message typically includes at least some of the status information or parameters about the node and may also include its aggregate weighted value. The information contained in the "status" message associated with each node 220A-220O can be used as input to a distributed algorithm executed on a processor in each node 220A-220O for selecting root nodes in the network. Each node can also compute or determine an aggregate weighted value for itself based on certain factors. The aggregate weighted value for a given node is one factor that can be used to establish the relative priority of that particular node for selection as a root node. Having each node decide whether it should nominate itself before transmitting a status message can reduce the number of candidate root nodes and hence the number of status messages which are transmitted in the ad hoc network to select a root node.

Figure 5:
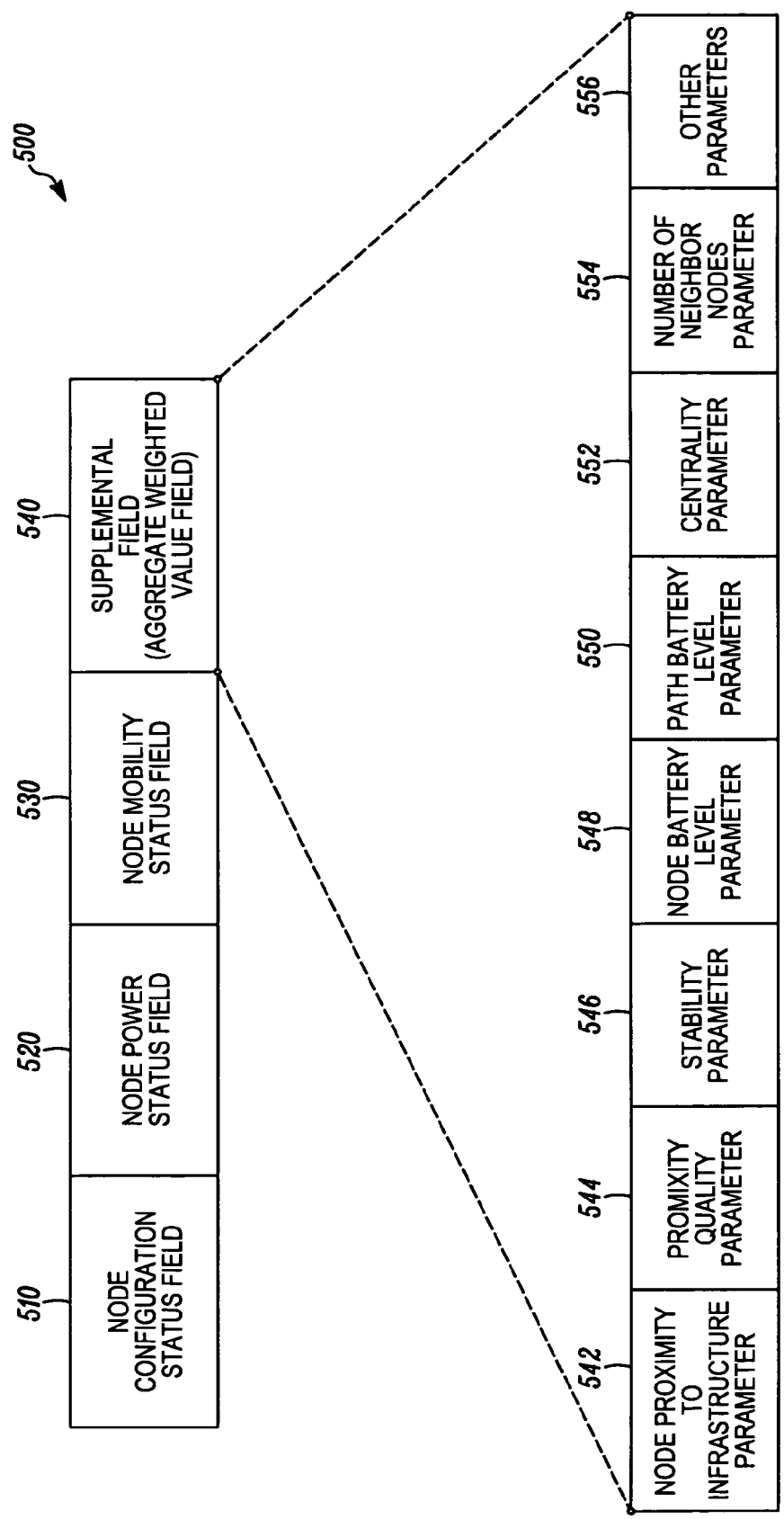
FIG. 5 is a data structure showing an exemplary implementation of a status message in accordance with some embodiments of the invention.

FIG. 5 is a data structure showing an exemplary implementation of a status message 500 in accordance with some embodiments of the invention. Each status message can include at least some of the criteria mentioned below to help facilitate root node selection. It will be appreciated that the criteria listed in FIG. 6 and FIG. 7 do not comprise an exhaustive list of criteria that may be used in the selection process. Some criteria can be selected according to certain implementations. For instance, in one implementation, nodes can simply broadcast a status message which comprises an aggregate weighted value. Moreover, some of the criteria or factors can be given a greater weight than weights given to other criteria or factors.

In one implementation, each status message 500 comprises a number of "primary factors" 510 regarding capabilities of the particular node and possibly "secondary factors" which can be used to generate an aggregate weighted value of secondary factors 540 associated with a particular node.

For example, in the exemplary implementation shown in FIG. 5, each status message 500 may comprise a datagram which includes a number of "primary factors" shown in fields 510-540. The fields can include, for example, a node configuration status field 510, a node power status field 520, a node mobility status field 530, and a supplemental field 540.

The node configuration status field 510 may designate each node, for example, as one of a priority root node candidate (Priority), a root node candidate (Able) or an excluded node (Not Able). A priority root node candidate is a node designated as having priority in being selected as a root node. A root node candidate is a node which is configured to be a root node and is permitted to be selected as a root node. An excluded node is a node which is precluded as being selected as a root node.

The node power status field 520 indicates whether the node is powered on and may optionally indicate the type of power source (e.g., battery or AC line power). Nodes having stable power supplies are more likely to be selected as a root node.

The node mobility status field 530 indicates whether the node is fixed, potentially mobile but presently stationary, or currently mobile. Highly mobile nodes are less likely to be selected as a root node since they are not stable. Selecting highly mobile nodes (or other non-stable nodes) as a root node would tend to drive over-the-air traffic up, which is undesirable. Hence there is a lower likelihood that highly mobile nodes (or other non-stable nodes) would be selected as the root node.

The supplemental field 540 may comprise a number of secondary factors, parameters and/or metrics 542-556, or, in one implementation, an aggregate weighted value of the number of secondary factors, parameters and/or metrics 542-556.

The secondary factors 542-556 which are considered and/or used to compute the aggregate weighted value are highly implementation dependent. Thus, while possible implementations are shown in FIGS. 5-8, it will be appreciated that the secondary factors considered as well as the weights on the secondary criteria, can change for various specific implementations of these techniques. For instance, in some implementations, a single secondary factor may be all that is used to determine and select a root node, while in other implementations, multiple or all of the secondary factors may be used to determine and select a root node.

In one implementation, the aggregate weighted value can be determined by considering secondary factors, parameters or metrics such as:

(a) node proximity to infrastructure parameter 542 (e.g., information as to whether or not the node is actively transmitting over an infrastructure-based network, etc. For example, nodes in close proximity to infrastructure equipment are more likely to be selected as root nodes. This can be specified as a hop count and could be infinity ($\infty$) if not connected.), (b) proximity quality parameter 544 or cumulative quality to the infrastructure (This can be determined, for example, based on the average received signal strength (RSS) of transmissions from the infrastructure, where a node with an average RSS falling within a predetermined range of values is more likely to be selected than a node with an average RSS falling outside the predetermined range of values. If the average RSS is higher than the predetermined range, this indicates that the node is close to its infrastructure (or has a good link to the infrastructure) and therefore is more likely to be selected as a root node. On the other hand, if the average RSS is lower than the predetermined range, this indicates that the node has unreliable connectivity to infrastructure and therefore the desirability of having it serve as a root node is low. For instance, a value of zero (0) can be used if the candidate node is not connected to infrastructure), (c) stability parameter 546 (e.g., number of route changes per unit time or number of route changes averaged over a window of time or other filtering operation), (d) node battery level parameter 548 or relative battery state of the node (e.g., a value from 0-100 which indicates the amount of power the node has remaining; a node with a low capacity or discharged battery is less likely to be selected than a device with a high capacity battery or AC line power), (e) path battery level parameter 550 (0-100 minimum battery level of all nodes used to get to the infrastructure (if no infrastructure connection, ignore this factor)), (f) number of neighbors parameter 554 (e.g., a candidate with higher number of neighbors is preferable or is a better candidate and is therefore more likely to be selected as a root node), (g) other parameters 556, such as, relative activity level of a node (e.g. nodes serving as a source, destination, or root in an active session are less likely to be selected by other nodes), and (h) centrality parameter 552 (e.g., average cost to all other nodes).

The centrality parameter can be used to select the root node based on the "cost" to other nodes in a number of different ways. For example, in the network topology 200 shown in FIG. 2, node 220A has a cost of 5 to get to node 220O since there are 5 hops between node 220A and node 220O. Similarly, node 220A has a cost of 4 to node 220F, a cost of 2 to node 220D, etc.

In one implementation, the centrality parameter can be used to select the root node to minimize the average cost to all other nodes. For instance, in the network topology 200 shown in FIG. 2, the average cost from node 220A to all other nodes in the network 200 and from node 220C to all other nodes in the network can be calculated. In this example, the average cost of node 220C to all other nodes in the network 200 is less than the average cost of node 220A to all other nodes in the network 200. Thus node 220C would be a better choice for selection as the root node than node 220A, since node 220C has a lower average cost.

In an alternate implementation, the centrality parameter can be used to select the root node to minimize the maximum cost to the most expensive node. For instance, in the network topology 200 shown in FIG. 2, the maximum cost from node 220A to any node is 5 (i.e., the path from 220A to 220O). The maximum cost from node 220C to any node is 4 (i.e., the path from node 220C to node 220O). Thus, node 220C would be a better choice for selection as the root node than node 220A, since node 220C has a lower maximum cost.

In yet another alternate implementation, the centrality parameter can be used to select the root node to maximize the number of nodes that would have cost less than a certain value. For instance, if the threshold cost is set to 4, then, from node 220A, there are 2 nodes (220N, 220O) which have a cost greater than the threshold. From node 220C, there are 0 nodes which have a cost greater than the threshold. Therefore, node 220C is a better choice for the root node than node 220A. By contrast, if the threshold was set to 3, then node 220H is a better choice than node 220A or 220C.

In yet another alternate implementation, the centrality parameter can be used to assign a cost (Cn) for each corresponding node. For example, the cost (Cn) could be set equal to (number of hops to that node)$^2$. Therefore, the cost (Cn) for each correspondent node could be $\{1, 4, 9, \ldots\}$.

These parameters (a)-(h) can be fed into an algorithm implemented in the processor of each node. This algorithm can determine an aggregate weighted value associated with a particular node. Such an algorithm typically includes scaling factors for each parameter to adjust the relative importance of each parameter in determining the aggregate weighted value. The aggregate weighted value 540 of parameters 542-556 can be represented, for instance, as a number between 0 and 100.

Continuing now with FIG. 4, at step 420, the status message from the node or nodes is received by one or more nodes in the ad hoc network.

In one embodiment of step 420, each node will receive information, including the status message, from and about other nodes in the ad hoc network. In another embodiment of step 420, a first node receives information, including a status message, from the current root node.

At step 430, the node or nodes which receive the status messages can evaluate the number of primary factors associated with each node.

In one embodiment of step 430, each node that receives a status message, can compare primary factors associated with each node to determine which of those nodes would be the optimum root node. In one such implementation, a node can eliminate any of the nodes which is not a root node candidate. Whether a particular node is a root node candidate can be determined, for example, based on capabilities or configuration of the particular node. In some cases, nodes can be pre-configured as having a certain configuration. For instance, in some implementations, a particular node may be configured as: (1) a priority root node candidate, (2) being able or permitted to be a root node candidate, or (3) never being able to be a root node candidate. In one implementation, each of the nodes which is a root node candidate can be added to a candidate list which can be stored at each of the nodes.

If more than one node is a root node candidate, then each of the nodes can compare other primary factors associated with each of the candidate nodes to determine which of the candidate nodes should be selected as the root node. The list of root node candidates can then be reduced based on the capabilities of each candidate node. These capabilities can include the type of power source for the particular node, whether the particular node is fixed or mobile, etc.

In another embodiment of step 430, a first node compares first primary factors associated with the first node to second primary factors associated with a current root node.

At step 440, the node or nodes which receive the status messages can attempt to select the root node based on the primary factors associated with each node that the node or nodes received a status message from.

In one embodiment of step 440, each node can attempt to select the root node by comparing one or more of the primary factors associated with each node.

In another embodiment of step 440, a first node can attempt to select the root node by comparing one or more of the primary factors associated with the current root node to one or more of the primary factors associated with the first root node. In this situation, the first node compares one or more of the primary factors with those of the current root node to determine if the first root node is a better root node than the current root node.

At step 450, the node or nodes which attempted to select the root node can decide if they were able to select the new root node based on the primary factors associated with each node. If so, after waiting for an evaluation period (e.g., hysteresis time) at step 460, the process loops back to step 410, where the node or nodes can attempt to select a new root node. In some cases, it is not possible to select a root node based solely on the primary factors. If the node or nodes which attempted to select the root node could not select the root node based on the primary factors associated with a particular node or with each node, then the process proceeds to step 470, where the node or nodes which receive the status messages can select the root node based on at least some of the secondary factors and/or the aggregate weighted value associated with each node.

Once the root node has been selected, each node waits for an evaluation period (e.g., hysteresis time) at step 460 before the process can loop back to step 410 where the node or nodes can attempt to select a new root node.

Specific implementations of these techniques for selecting a root node will now be described below with reference to FIGS. 6-8.

Omniscient Root Node Selection

In one embodiment, referred to as an omniscient root node selection technique, each node receives status messages from all (or most of) the other nodes in the ad hoc network. Thus, in this embodiment, each node has status information associated with most or all of the other nodes in the ad hoc network. Each of the nodes (or some of the nodes) can select the root node by analyzing or comparing the status information associated with each of the nodes.

Figure 6:
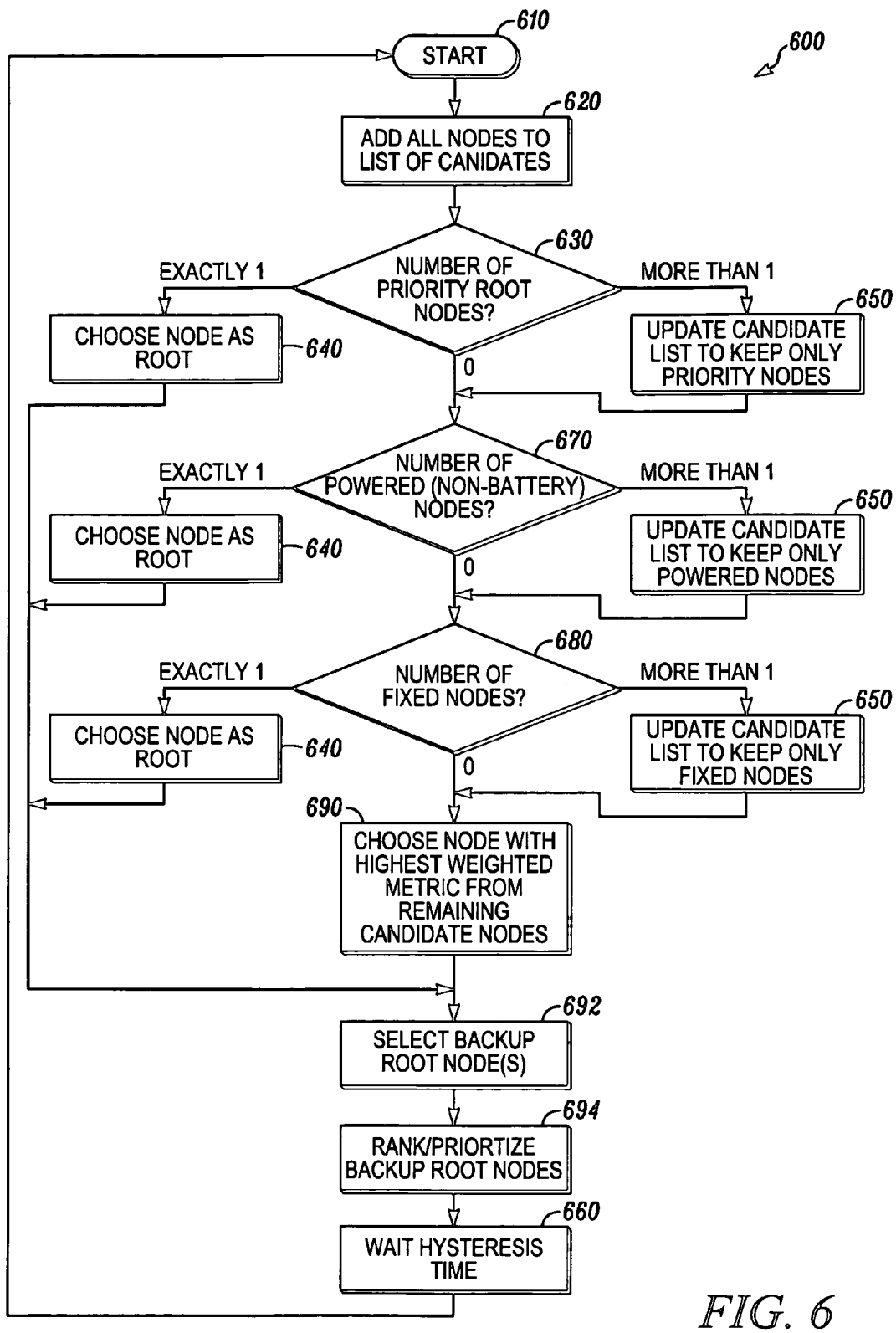
FIG. 6 is a flowchart showing another exemplary method for dynamically selecting a root node in an ad hoc network in accordance with some embodiments of the invention.

FIG. 6 is a flowchart showing another exemplary method 600 for dynamically selecting a root node in an ad hoc network in accordance with some embodiments of the invention.

The process starts at step 610, where each of the nodes can transmit or broadcast a status message. Alternatively, in one implementation, only nodes which are configured as root node candidates can broadcast their qualification parameters, for instance, in a Root node Qualification Message (RQM). This allows each node to provide information, including their respective status messages, to other nodes in the ad hoc network. The nodes may broadcast the RQM either periodically or after a particular parameter has changed significantly.

Each node receiving a status message executes the root node selection process described above (or a variation thereof). At step 620, each of the nodes transmitting a status message can be added to a root node candidate list. As noted above, each node can be designated as having either a priority root node candidate status, a root node candidate status or an excluded node status.

At step 620, each of the nodes which transmits a status message can be added to a candidate list which can be stored at each of the nodes. Each of the nodes can compare the primary factors associated with each of the candidate nodes to attempt to select one of the candidate nodes as the root node. Each of the nodes (or some of the nodes) can attempt to select the root node based on its analysis of or comparison of the primary factors associated with each of the nodes.

While the embodiment shown in FIG. 6 shows a specific order for checking the primary factors at steps 630, 670-690 it will be appreciated that the primary factors that are considered, as well as the order in which those primary factors are considered, can change for various specific implementations of these techniques.

In one implementation, each of the nodes can determine, at step 630, whether the number of priority nodes is greater than, less than or equal to one. The nodes can make this determination based on a node configuration status field 510 which can be used to designate each node as one of a priority root node candidate (Priority), a root node candidate (Able) or an excluded node (Not Able).

If the number of priority nodes is greater than one, then the process proceeds to step 650, where each node can update its candidate list to include only the priority nodes (e.g., priority root node candidates or root node candidates) by removing nodes, other than the nodes designated as priority nodes, from the candidate list before proceeding to step 670.

If the number of priority nodes is equal to one, then the process proceeds to step 640, where the priority node is chosen as the new root node.

Once the new root node is selected, it can transmit a root node assertion message. The root node assertion message allows for a determination as to whether or not multiple nodes have assumed the role of root node. In addition, by forcing nodes to stop forwarding frames when they determine a new root node is selected until the root node assertion message is received minimizes the time during which some nodes route to the first root node and others route to the second root node, thus minimizing the time during which routing loops can occur.

After transmitting and receiving the assertion message, the process proceeds to step 660, where the nodes in the network wait for an evaluation period (e.g., hysteresis time) before attempting to select a new root node according to the method 600. In other words, unless the current root node leaves the network after it has been selected, the selected root node remains as the root node for a period of time, and a new root node can not selected again until the evaluation period elapses. Thus, in this implementation, after choosing the remaining candidate node having the highest weighted metric as the root node, the nodes can wait for an evaluation period (e.g., hysteresis time) before attempting to select a new root node in an ad hoc network at step 610.

If the number of priority nodes is zero (e.g., there are no priority nodes), then the process proceeds to step 670, where each of the nodes determines if the first number of nodes in the candidate list are powered nodes.

If the number of powered nodes on the updated candidate list is greater than one, then the process proceeds to step 650, where each node can update its candidate list to include only the powered nodes by removing nodes, other than the nodes designated as powered nodes, from the candidate list and before proceeding to step 680.

If the number of powered nodes on the updated candidate list is equal to one, then the process proceeds to step 640, where the powered node is chosen as the new root node. Once the new root node is selected, it can transmit a root node assertion message. After transmitting and receiving the assertion message, the process proceeds to step 660, where the nodes in the network wait for an evaluation period (e.g., hysteresis time) before attempting to select a new root node according to the method 600. In other words, after choosing the remaining candidate node (that is a power node) as the root node, the nodes wait for an evaluation period (e.g., hysteresis time) before attempting to select a new root node in an ad hoc network at step 610.

If the number of powered nodes on the updated candidate list is zero, then the process proceeds to step 680, where each node can determine a second number of fixed nodes from the remaining nodes on the updated candidate list.

If there is only one fixed node on the updated candidate list (i.e., the number of fixed nodes is equal to one), then the process proceeds to step 640, where the fixed node is chosen as the root node. Once the new root node is selected, it can transmit a root node assertion message. After transmitting and receiving the assertion message, the process proceeds to step 660, where the nodes in the network wait for an evaluation period (e.g., hysteresis time) before attempting to select a new root node according to the method 600.

If the number of fixed nodes on the updated candidate list is greater than one, then the process proceeds to step 650, where the candidate list is updated again such that only fixed nodes remain on the updated root node candidate list before proceeding to step 690.

If the number of fixed nodes on the updated candidate list is zero, then the process proceeds to step 690, where each node can evaluate an aggregate weighted value associated with for each remaining candidate node, determine which of the remaining candidate nodes has the highest aggregate weighted value, and then select the remaining candidate node having the highest aggregate weighted value as the root node. Depending upon the implementation, each aggregate weighted value can be determined based on an aggregate weighted value of secondary factors or based on selected ones of the secondary factors. In one exemplary implementation, the aggregate weighted value can be represented, for instance, as a number between zero (0) and one hundred (100).

Once the remaining candidate node having the highest aggregate weighted value is selected as the new root node, then the new root node can transmit a root node assertion message.

In some cases, the current root node realizes that it is about to no longer be part of the ad hoc network, and can send a message indicating that it is no longer going to be available to the network prior to going completely out of range or starting a power down sequence. Should the current root node fail (e.g., shut down, or leave the communication range of the ad hoc network), it is desirable to have at least one backup or secondary root node designated in advance. By pre-designating a backup root node problems associated with time delays and/or packet loss in routing information throughout the network to select a new root node can be reduced and/or eliminated.

At step 692, once the new root node has been selected (and assuming that there is more than one node in the ad hoc network), at least one and possibly a number of backup root nodes can optionally be selected. It should be appreciated that if there is only one node in the network, then there can not be backup root nodes, and therefore steps 692 and 694 will not be performed. Moreover, if there are only two nodes in the network (e.g., the current root node and another node), then after selecting the current root node, the remaining node becomes the secondary or backup root node by default.

In one implementation, the current root node selects one of its immediate neighbors as the secondary backup root node. In an alternative implementation, a secondary root node can be selected based on primary factors such as the capabilities of the node, whether it is fixed or mobile, whether it is configured to be a root (or configured to never be the root), and/or secondary factors and/or its aggregate weighted value. For example, the first backup root node can be selected by re-executing the same basic steps shown in steps 620-690 that were used to select the current root node, however, in selecting the first backup root node, at step 620, the current root node would not be included on the list of candidate root nodes, and therefore can not be selected as a backup root node. Similarly, when selecting the second backup root node, the same basic steps shown in steps 620-690 can again be executed, however, in selecting the second backup root node, at step 620, the current root node and the backup root node are not be included on the list of candidate root nodes, and therefore can not be selected as a backup root node.

At step 694, the current root node can rank or prioritize the selected backup root nodes. The current root node can assign each backup root node as being a secondary root node, tertiary node, quaternary node, etc.

When the current root node is no longer available for some reason (e.g., no longer present in the ad hoc network, goes out of range and/or fails to send a reply to a message), then the first backup root node assumes the role of the current or primary root node, and transmits an announcement message to other nodes in the network. If the first backup root node is no longer available for some reason, then the second backup root node assumes the role of the current or primary root node, transmits an announcement message to other nodes in the network, etc.

In one implementation, if a backup root node determines that certain parameters fall below a threshold, then that particular backup root node will transmit a message to other nodes in the network indicating that it is no longer a backup root node. Nodes receiving this message will then select a new backup root node.

After transmitting and receiving the assertion message, the process proceeds to step 660, where the nodes in the network wait for an evaluation period (e.g., hysteresis time) before attempting to select a new root node according to the method 600. In other words, after choosing the remaining candidate node having the highest weighted metric as the root node, the nodes can wait for an evaluation period (e.g., hysteresis time) before attempting to select a new root node in an ad hoc network at step 610.

Multiple Root Node Detection and Elimination

Each of the nodes will typically arrive at the same selection, however, in the event this does not happen (e.g., each of the nodes do not arrive at the same selection), then techniques are provided for detecting and eliminating multiple root nodes. For example, techniques are provided for determining if multiple root node nodes exist, and eliminating some of the root nodes to reduce the number of root nodes to a single root node. For instance, in one implementation, nodes in a particular ad hoc network can include the root node's Basic Service Set IDentifier (BSSID) to the beacons (or other routing information frames). The BSSID is an identifier used in frame headers by all stations that are logically associated with each other via a basic service set. These techniques can be useful, for instance, in situations in which multiple ad hoc networks merge since it will be clear that particular nodes belong to separate networks with different root nodes even though the nodes use the same Service Set IDentifier (SSID). Before the two networks can merge (e.g., before two edge nodes in each net can associate with each other) each network can decide whether to merge and create one seamless ad hoc network or whether to keep two separate networks (e.g., with edge nodes acting like bridges). If it is decided that the two networks will merge, the root node selection techniques described above can be rerun with all the candidate root nodes in a new, initial candidate list.

Myopic Root Node Selection

In another embodiment, referred to as a myopic root node selection technique, each node has status information about a current root node (only), and can determine if it is better suited to become the new root node. For example, in one embodiment, a particular node or "first" node selects a new root node based on a result of comparing first primary factors associated with the first node to second primary factors associated with the current root node. The first node can select the new root node based on a result of comparing the first primary factors to the second primary factors. In this embodiment, the new root node that is selected may comprise either the first root node or the current root node.

Any of the first nodes which determine that it is better suited to be the current root node (e.g., has better status metrics than the current root node) can then transmit a relinquish request message to the current root node to request that the current root node relinquish control or its status as the root node. If control is not granted, the first node does not attempt to serve as the root node. If a relinquish response message is not received in response to the relinquish request message, then it will be assumed that the current root node has gone away, and the new node can transmit a root node assertion message to assert control and attempt to serve as the root node. The relinquish response message can be, for example, a relinquish confirm message indicating that the node is relinquishing its role as root node, or a relinquish denial message indicating that it is the root node and will not relinquish its role as root node or that it is not the root node. This could be accomplished by two different messages, or it could be accomplished by a single message with different data values within the message, or other mechanisms.

Figure 7:
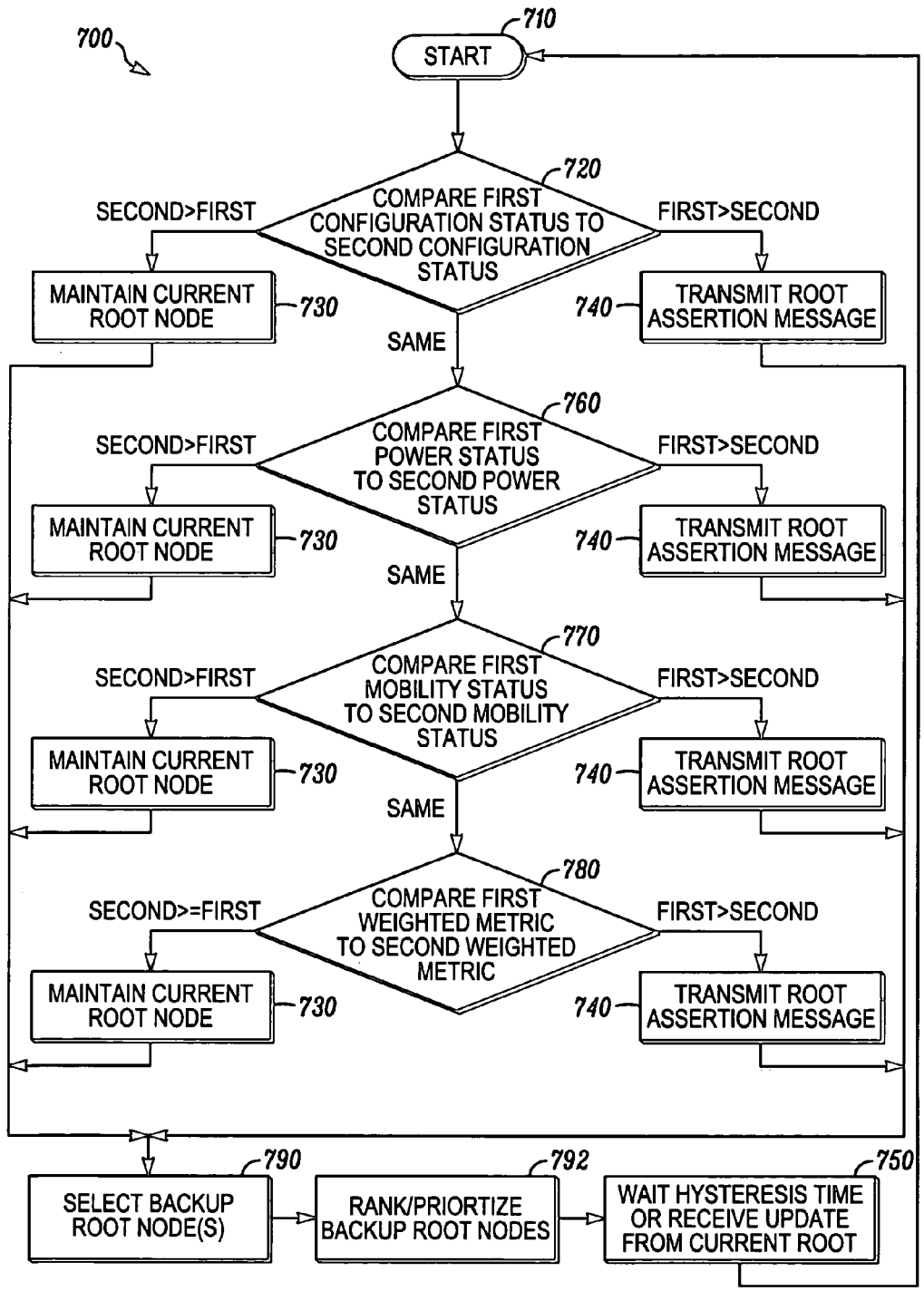
FIG. 7 is a flowchart showing another exemplary method for dynamically selecting a root node in an ad hoc network in accordance with some embodiments of the invention.
Figure 8:
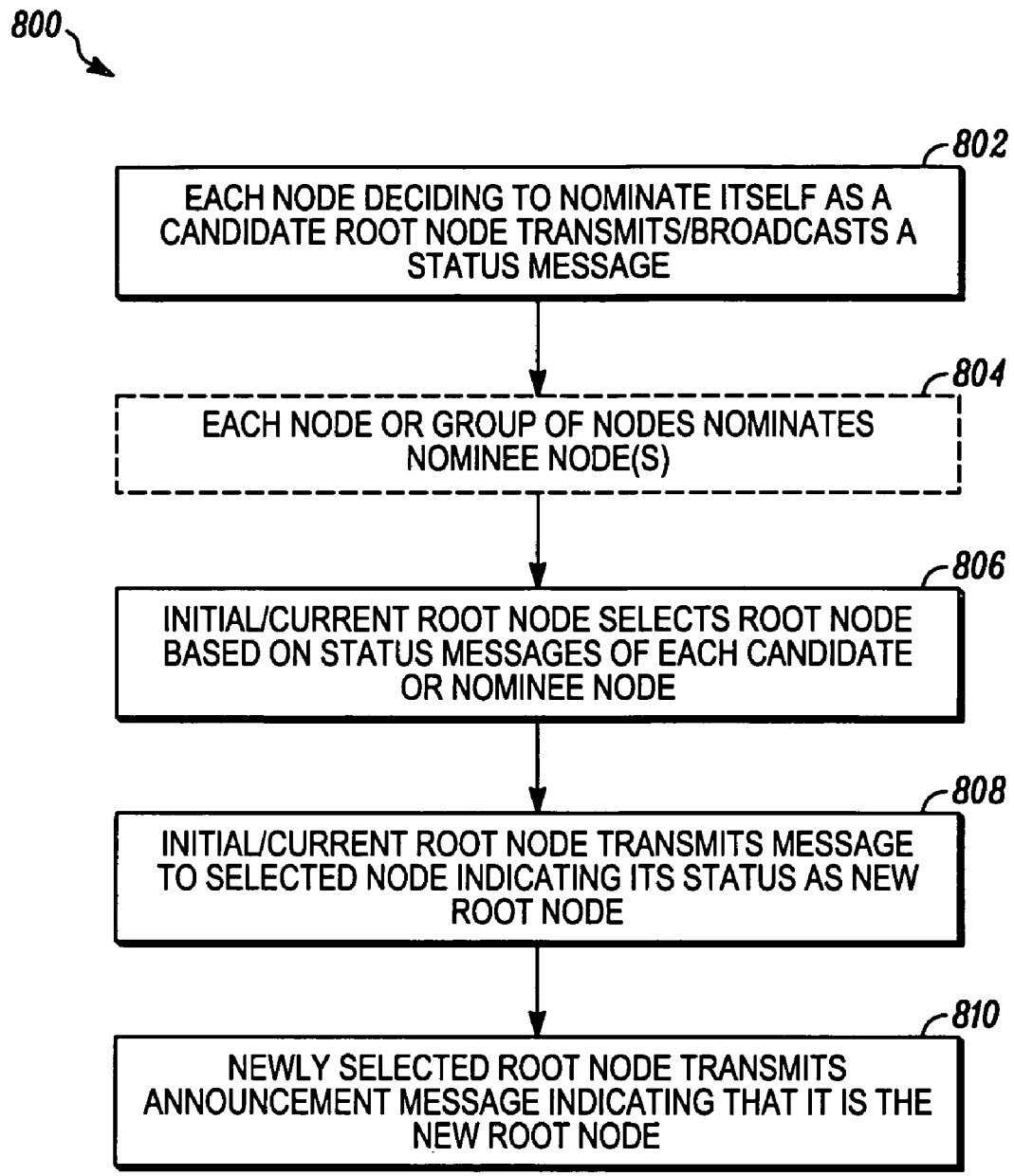
FIG. 8 is a flowchart showing another exemplary method for dynamically selecting a root node in an ad hoc network in accordance with some embodiments of the invention.

FIG. 7 is a flowchart showing another exemplary method 700 for dynamically selecting a root node in an ad hoc network in accordance with some other embodiments of the invention. In this implementation, each node will have status information about the current root node, and can determine if the node is better suited than the current root node to become the new root node. According to this method 700, a first node compares first primary factors associated with the first node to second primary factors associated with the current root node, and selects a new root node based on the comparison of the first primary factors to the second primary factors. Although FIG. 7 shows a particular implementation of this embodiment, it will be appreciated that the order of checking the primary factors, as well as the weights on the secondary factors (or the secondary factors which are considered), can change for other specific implementations of these techniques.

The method 700 can start at step 710, where the current root node can transmit a status message. The current root node can broadcast a status message periodically or when its status metrics drop below a certain dynamic threshold.

At step 720, the first node can use the message from the current root node to determine if a first root configuration status of the first node is greater than, less than or equal to a second root configuration status of a current root node.

If the first root configuration status of the first node is greater than a second root configuration status of a current root node, then at step 740, the first node can decide to transmit a root assertion message. At step 750, the first node waits for an evaluation period (e.g., hysteresis time) after asserting that the first node is the new root node before attempting to select a new root node for the ad hoc network.

If the first root configuration status of the first node is less than the second root configuration status of the current root node, then at step 730, the first node can decide to select or maintain the current root node as the root node. In this case, the first node does nothing or can transmit a message indicating that the current root node is the root node. Once the new root node has been selected, then at step 750, the first node waits for an evaluation period (e.g., hysteresis time) after asserting that the first node is the new root node before attempting to select a new root node for the ad hoc network.

If first root configuration status of the first node is the same as the second root configuration status of the current root node, then the method 700 can proceed to step 760 where the first node can determine if its power status is greater than, less than or equal to a second power status of the current root node.

If the first power source is less than the second power source, then at step 730, the first node can passively select or maintain the current root node as the root node. After deciding to maintain the current root node as the root node, at step 750, the first node waits for an evaluation period (e.g., hysteresis time) before attempting to select a new root node in the ad hoc network.

If the first node determines that the first power source is greater than the second power source at step 760, then at step 740, the first node can decide to transmit a root assertion message. At step 750, the first node waits for an evaluation period (e.g., hysteresis time) after asserting that the first node is the new root node before attempting to select a new root node for the ad hoc network.

If the first node determines that the first power source is the same as the second power source, then the process can proceed to step 770 where the first node can determine if its mobility status (e.g., a first mobility status) of the first node is greater than, less than or equal to a second mobility status of the current root node.

If the first node determines that the first mobility status is less than the second mobility status at step 770, then the first node can decide to maintain the current root node as the root node at step 730. As above, after deciding to maintain the current root node as the root node at step 730, the first node waits for an evaluation period (e.g., hysteresis time) at step 750 before the first node can attempt to select a new root node in the ad hoc network.

If the first node determines that the first mobility status is greater than the second mobility status at step 770, then the first node can select itself as the new root node and transmit a root assertion message at step 740. As above, after asserting that the first node is the new root node at step 740, the first node waits for an evaluation period (e.g., hysteresis time) at step 750 before the first node can attempt to select a new root node in the ad hoc network.

If, at step 770, the first node determines that first mobility status of the first node is the same as the second mobility status of the current root node, then the process can proceed to step 780, where the first node can determine if a first weighted metric associated with the first node is greater than a second weighted metric associated with the current root node. As described above at step 590, each weighted metric can be determined based on an aggregate weighted value of secondary factors or selected ones of the secondary factors.

If the first node determines at step 770 that the first weighted metric associated with the first node is greater than a second weighted metric associated with the current root node, then the first node can select itself as the new root node and transmit a root assertion message at step 740.

If the first node determines at step 770 that the first weighted metric associated with the first node is less than the second weighted metric associated with the current root node, then the first node can select/maintain the current root node as the new root node at step 730.

As noted above, it is desirable to have at least one backup or secondary root node designated in advance should the current root node fail (e.g., shut down, or leave the communication range of the ad hoc network).

At step 790, once the new root node has been selected (and assuming that there is more than one node in the ad hoc network), at least one and possibly a number of backup root nodes can optionally be selected. It should be appreciated that if there is only one node in the network, then there can not be backup root nodes, and therefore steps 790 and 792 will not be performed. Moreover, if there are only two nodes in the network (e.g., the current root node and another node), then after selecting the current root node, the remaining node becomes the secondary or backup root node by default.

In one implementation, the current root node selects one of its immediate neighbors as the secondary backup root node.

In an alternative implementation, if a backup root node has already been selected or designated, each node in the network can re-execute the process in steps 720-780 to determine if that particular node is better suited to be the backup root node than a current backup root node. Each node can make this determination based on primary factors such as the capabilities of the node, whether it is fixed or mobile, whether it is configured to be a root (or configured to never be the root), and/or secondary factors and/or its aggregate weighted value.

Assuming that the particular node determines it is better suited to be the backup root node than a current backup root node (e.g., has better characteristics than the current backup root node), then the particular node can transmit a relinquish request message to the current backup root node requesting it to relinquish its status as the backup root node. If accepted, the current backup root node sends a root relinquished message to the particular node (and possibly other nodes in the network). The new backup root node can then transmit a message indicating its status as a new backup root node to the current root node. In one implementation, the particular root node will send an announcement message indicating that it is the new current back up root node.

However, in another implementation, the current root node plays an active role in selecting the backup root node(s). For example, as shown at step 792, the current root node can receive the announcement messages from the candidate backup root node(s), rank or prioritize the candidate backup root nodes, select an appropriate number of backup root nodes, and designate each selected backup root node as being a secondary root node, tertiary node, quaternary node, etc.

When the current root node is no longer available for some reason (e.g., no longer present in the ad hoc network, goes out of range and/or fails to send a reply to a message), then the first backup root node assumes the role of the current or primary root node, and transmits an announcement message to other nodes in the network. If the first backup root node is no longer available for some reason, then the second backup root node assumes the role of the current or primary root node, transmits an announcement message to other nodes in the network, etc.

In one implementation, if a backup root node determines that certain parameters fall below a threshold, then that particular backup root node will transmit a message to other nodes in the network indicating that it is no longer a backup root node. Nodes receiving this message will then select a new backup root node.

After either deciding to maintain the current root node as the root node at step 730 or asserting that the first node is the new root node at step 740, the first node waits for an evaluation period (e.g., hysteresis time) at step 750 before the first node can attempt to select a new root node in the ad hoc network.

Hybrid Omniscient/Myopic Root Node Selection Technique

A hybrid omniscient/myopic root node selection technique is provided which combines aspects of both the omniscient root node selection technique and the myopic root node selection technique. According to this hybrid omniscient/myopic root node selection technique, nodes can transmit their status messages to an initial/current root node 220H. For example, according to one embodiment, each node forwards a status message to other nodes in the network until the initial/current root node 220H receives a status message from each node in the ad hoc network. The initial/current root node 220H can then use the status messages from each node to select a new root node from amongst these nodes. This selection can be made using, for example, the techniques described with reference to FIGS. 4, 5 and 7 and/or using some of the techniques described below.

FIG. 8 is a flowchart showing another exemplary method 800 for dynamically selecting a root node in an ad hoc network in accordance with some embodiments of the invention.

At step 802, each of the nodes deciding to nominate itself as a root node candidate can transmit its status message to the current/initial root node 220H.

In one implementation of step 802, each node 220A-220O in the ad hoc network can nominate itself as a candidate node by transmitting/broadcasting a status message.

In another implementation of step 802, each node can decide whether or not to nominate itself as a root candidate depending on the relative likelihood of that node being selected as a root node. In this implementation, only certain nodes decide to transmit/broadcast a status message to nominate themselves as candidate root nodes. For example, each node can decide whether or not to nominate itself by comparing its aggregate weighted value to a low threshold ($T_L$) and a high threshold ($T_H$). Thresholds can be used to help reduce the number of nodes which might be considered as candidate nodes. For instance, if a given group includes a large number of nodes (e.g., 100), nodes having an aggregate weighted value that falls below a certain low threshold ($T_L$) will automatically be eliminated from the candidate pool. Similarly, nodes having an aggregate weighted value which exceeds a high threshold ($T_H$) are nominated as a candidate for the root node selection. This reduces the number of nodes which need to be evaluated and thus simplifies the task of selecting potential candidate root nodes. By contrast, if a given group includes a low number of nodes) then all nodes might exceed the high threshold ($T_H$) in which case all nodes might be nominated as candidate root nodes.

Two techniques for selecting new root node 220Ms will now be described with reference to steps 804 and 806 of FIG. 8. In FIG. 8, the dashed line around step 804 is used to indicate that this step is optional.

In one embodiment, step 804 is not performed and the current/initial root node 220H directly selects the new root node 220M based on status messages received from each candidate root node. In other words, the method proceeds directly to step 806 from step 802. At step 802, each node deciding to nominate itself as a candidate node forwards its status message to other nodes in the network until the current/initial root node 220H receives status messages from each candidate node in the ad hoc network 200. At step 806, the current/initial root node 220H uses the status information specified in each of the status messages to directly select new root node 220M. The current/initial root node 220H can rank the candidate root nodes and select the candidate root node that will result in the best system performance. Alternatively, the current/initial root node 220H compares and evaluates selected parameters from the status messages from each of nodes, and then selects at least one of the nodes as the root node.

In another embodiment, following step 802, both steps 804 and 806 are performed in the selection of new root node 220M. According to this two step selection process, both the nodes in the ad hoc network 200 and the current/initial root node 220H play a role in deciding which node or nodes should be selected as the new root node 220M.

At step 804, nodes in a particular group nominate "nominee nodes." The nodes in a given group can regularly share status information with each of the other nodes in their group regarding their ability or inability to act as a root node. Each node in the group can use this status information to nominate at least one of its neighbor nodes to serve as a root node. In one embodiment, the nodes in each group (e.g., a node and its neighbor nodes) negotiate which node in the group should be selected as a new root node for that group. For example, in one implementation, each node compares the status information for each neighbor node it receives a status message from (and its own status information), and nominates one of the nodes as a nominee node for that group. This can be done, for example, by selecting the node having the best primary factors, secondary factors and/or the highest aggregate weighted value as the candidate root node for that group. If a number of nodes are nominated, then the relative priority of each node (e.g., ranking) can also be negotiated among the nodes and specified.

At step 806, once the nominee nodes are nominated, the current/initial root node 220H then selects new root node 220Ms from the nominee nodes nominated by each group. The current/initial root node 220H can compare and evaluate status information associated with each of the nominee nodes, and then select one of the nominee nodes as the new root node. In one embodiment, the status information for each node can then be used to establish the relative priority of each nominee node. In one implementation, the current/initial root node 220H can select one of the nominee nodes as a root node based on a comparison of the status information for each node. Again, the initial/current root node 220H can select at least one of the candidate nodes as a root node based on a comparison of the primary factors, secondary factors and/or the aggregate weighted values associated with each candidate node.

After the current/initial root node 220H eventually selects the new root node 220Ms, at step 808, the current/initial root node 220H broadcasts a message to node 220M indicating that node 220M has been selected as the new root node 220M. At step 810, new root node 220M broadcasts an announcement message to all its neighbor nodes and confirming its status as the new root node. The announcement message associated with a node includes an indicator indicating that the node is a root node, and may optionally include an indication of the corresponding group for which the node is a root node.

In the foregoing specification, specific embodiments of the present invention have been described. However, one of ordinary skill in the art appreciates that various modifications and changes can be made without departing from the scope of the present invention as set forth in the claims below. For example, while the description above describes selection of a root node in an ad hoc network, it should be appreciated that these concepts can also be applied to multicast groups as well, where a subset of the nodes in the ad hoc network belongs to a multicast group. In such cases, the techniques described above could be used to elect a multicast root node (MRN) for distributing multicast messages. When there are multiple multicast groups, then a MRN can be selected for each particular group. For example, each particular multicast group can select its own independent MRN from nodes that are members of that particular multicast group. In addition, service types may be used as a basis for establishing multicast groups. Service types can be low-latency (e.g., full duplex voice), low-jitter (e.g., multicast audio/video), best-effort (e.g., email), etc. Since different service types may have different resource requirements, this helps ensure that MRNs are well matched to their service type (e.g., select a particular node only if the node has matching Service ID for the services types purchased during the entry, etc.)

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for dynamically selecting a new root node in an ad hoc network comprising a current root node and a plurality of nodes, the method comprising:

nominating at each of the plurality of nodes a candidate root node by comparing an aggregate weighted value for that particular node to a low threshold ($T_L$) and a high threshold ($T_H$), and deciding at each of the plurality of nodes whether to nominate itself as the candidate root node depending on its relative likelihood of being selected as the new root node;

transmitting, from each of the plurality of nodes, a first status message associated with its nominated candidate root node when the aggregate weighted value for that particular node exceeds the high threshold ($T_H$);

receiving the first status messages at the current root node; and selecting, at the current root node, the new root node from at least one of the candidate root nodes and the current root node based on the received first status messages.

2. A method according to claim 1, wherein nodes having the aggregate weighted value below the low threshold ($T_L$) do not transmit the first status message.

3. A method according to claim 1, wherein each of the first status messages comprises status information, wherein selecting, at the current root node, the new root node from at least one of the candidate root nodes and the current root node based on the received first status messages, further comprises:

selecting, at the current root node, the new root node from at least one of the candidate root nodes and the current root node based on at least some of the status information in the received first status messages.

4. A method according to claim 1, wherein each of the first status message comprises at least one of a number of primary factors associated with a corresponding candidate root node regarding capabilities of the corresponding candidate root node, and wherein selecting, at the current root node, the new root node from at least one of the candidate root nodes and the current root node, further comprises:

evaluating primary factors associated with each candidate root node; and attempting to select the new root node based on the primary factors associated with each candidate root node.

5. A method according to claim 4, wherein each of the first status message comprises a number of primary factors associated with a corresponding candidate root node regarding capabilities of the corresponding candidate root node, and wherein evaluating a number of primary factors associated with each of the candidate root node, comprises:

comparing, at each of the plurality of nodes, primary factors associated with each of the candidate root nodes.

6. A method according to claim 4, wherein attempting to select the new root node based on the primary factors associated with each candidate root node, comprises:
selecting, at the current root node, the new root node based on a result of comparing the primary factors associated with each of the candidate root nodes.

7. A method according to claim 4, wherein the first status message from each of the candidate root nodes comprises a qualification status message indicating the configuration of the corresponding candidate root node as being capable of selection of the corresponding candidate node as the new root node, the method further comprising:
adding each of the candidate root nodes to a candidate list stored at each of the plurality of nodes.

8. A method according to claim 4, wherein comparing the primary factors associated with each of the candidate root nodes, further comprises:
determining, at each of the plurality of nodes, whether a number of candidate root nodes with a priority of being selected as the new root node in the candidate list is greater than, less than or equal to one; and
removing candidate root nodes other than the candidate nodes with the priority of being selected as the new root node from the candidate list, at each of the plurality of nodes, when the number of candidate root nodes with the priority of being selected as the new root node is greater than one.

9. A method according to claim 8, wherein selecting the new root node, further comprises:
choosing the candidate root node with the priority as the new root node, when the number of the candidate root nodes with the priority of being selected as the new root node is equal to one.

10. A method according to claim 9, wherein comparing the primary factors associated with each of the candidate root nodes further comprises:
determining a first number of the candidate root nodes in the candidate list that are powered ON, when the number of the candidate root nodes with the priority of being selected as the new root node is zero or more than one;
removing the candidate root nodes other than the candidate root nodes that are powered ON from the candidate list, when the number of the candidate root nodes that are powered ON is greater than one; and
wherein selecting the new root node, further comprises:
choosing the candidate root node that is powered ON as the new root node, when the number of the candidate root nodes that are powered ON is equal to one.

11. A method according to claim 10, wherein comparing the primary factors associated with each of the candidate root nodes further comprises:
determining a second number of the candidate root nodes in the candidate list that are fixed, when the number of the candidate root nodes that are powered ON is zero or more than one;
removing the candidate root nodes other than the candidate root nodes that are fixed from the candidate list, when the number of the candidate root nodes that are fixed is greater than one; and
wherein selecting the new root node, further comprises:
choosing the candidate root node that is fixed as the new root node, when the number of the candidate root nodes that are fixed is equal to one.

12. A method according to claim 11, wherein each of the first status messages further comprises at least one of a number of secondary factors associated with a corresponding candidate root node regarding capabilities of the corresponding candidate root node, and further comprising:
selecting the new root node based on at least one secondary factor associated with each candidate root node when the current root node is unable to select the new root node based on the primary factors associated with each candidate root node.

13. A method according to claim 12, wherein selecting the new root node based on the secondary factors associated with each candidate root node when the current root node is unable to select the new root node based on the primary factors associated with each candidate root node, further comprises:
determining a weighted metric for each of candidate root node that is powered OFF, mobile and is without a priority of being selected as the new root node, when the number of candidate root nodes that are fixed is zero or more than one;
determining which candidate root node among the candidate root nodes without a priority of being selected as the new root node and neither powered ON nor fixed has the highest weighted metric; and
wherein selecting the new root node, further comprises:
selecting the candidate root node among the candidate root node that is powered OFF, mobile and is without a priority of being selected as the new root node and have the highest weighted metric as the new root node, when the number of the candidate root nodes that are fixed is zero.

14. A method according to claim 13, wherein the secondary factors comprise:
(a) proximity of a corresponding candidate root node to infrastructure, (b) proximity quality of the corresponding candidate root node to the infrastructure, (c) stability of the corresponding candidate root node based on the number of route changes per unit time, (d) node battery level of the corresponding candidate root node which indicates the amount of power the corresponding candidate root node has remaining, (e) path battery level for the corresponding candidate root node and intervening nodes between the corresponding candidate root node and the infrastructure, (f) average cost to all other nodes, and (g) number of neighbor nodes, and
wherein each weighted metric is determined based on an aggregate weighted value of the secondary factors.

15. A method according to claim 1, wherein nominating at each of the nodes a candidate root node, further comprises:
transmitting a second status message from each of the plurality of nodes, wherein each of the second status messages comprises status information regarding the ability of the corresponding node to serve as a root node;
receiving at least some of the second status messages at each of the plurality of nodes; and
selecting, at each of the plurality of nodes, either itself or one of the plurality of nodes as the candidate root node based on the received second status messages.

16. A method according to claim 15, wherein transmitting a first status message associated with its nominated candidate root node, further comprises:
transmitting the first status message from each of the plurality of nodes to the current root node, wherein each of the first status messages identifies the corresponding candidate root node and status information associated with the corresponding candidate root node.

17. A method according to claim 16,
wherein selecting, at the current root node, the new root node based on the received first status messages, further comprises:

selecting, at the current root node, the new root node from at least one of the candidate root nodes and the current root node based on the status information associated with each candidate root node and a status information associated with the current root node.

18. A method according to claim 15, wherein selecting, at each of the nodes, either itself or one of the plurality of nodes as the candidate root node based on the received first status messages, further comprises:
comparing, at each of the plurality of nodes, the status information associated with each of the plurality of nodes with its status information; and
nominating, at each of the plurality of nodes, one of the plurality of nodes as the candidate root node based on the status information associated with a corresponding one of the plurality of nodes with its status information.

19. A method according to claim 15, wherein the status information associated with each of the plurality of nodes comprises at least one of one or more primary factors, one or more secondary factors and one or more aggregate weighted values associated with a corresponding one of the plurality of nodes, and wherein selecting, at each of the plurality of nodes, either itself or one of the plurality of nodes as the candidate root node based on the received second status messages, further comprises:
comparing, at each of the plurality of nodes, the at least one of the primary factors, the secondary factors and a highest aggregate weighted value associated with a corresponding one of the plurality of nodes with its; and
nominating, at each of the plurality of nodes, one of the nodes as the candidate root node based on the at least one of the primary factors, the secondary factors and the highest aggregate weighted value associated with a corresponding one of the plurality of nodes and its status information.

20. A method according to claim 17, wherein the status information associated with each of the plurality of nodes comprises at least one of one or more primary factors, one or more secondary factors and one or more aggregate weighted values associated with a corresponding one of the plurality of nodes, and
wherein selecting, at the current root node, the new root node from at least one of the candidate root nodes and the current root node based on the status information associated with the corresponding one of the candidate root node and status information associated with the current root node, further comprises:
selecting, at the current root node, the new root node from at least one of the candidate root nodes and the current root node based on the at least one of the primary factors, the secondary factors and the aggregate weighted values associated with the corresponding one of the candidate root node and the at least one of the primary factors, the secondary factors and the aggregate weighted values associated with the current root node.

21. A method according to claim 20, wherein each of the first status message comprises at least one of a number of primary factors associated with a corresponding node regarding capabilities of the corresponding node, and wherein selecting, at the current root node, the new root node from at least one of the candidate root nodes and the current root node based on the at least one of the primary factors, the secondary factors and the aggregate weighted values associated with each of the candidate root node and the at least one of the primary factors, the secondary factors and the aggregate weighted values associated with the current root node, further comprises:
selecting, at the current root node, the new root node from at least one of the candidate root nodes and the current root node based on the at least one primary factor associated with each candidate root node and the at least one primary factor associated with the current root node.

22. A method according to claim 20, wherein each of the first status message comprises a number of primary factors associated with a corresponding node regarding capabilities of the corresponding node, and wherein selecting, at the current root node, the new root node from at least one of the candidate root nodes and the current root node based on the at least one of the primary factors, the secondary factors and the aggregate weighted values associated with each of the candidate root node and the at least one of the primary factors, the secondary factors and the aggregate weighted values associated with the current root node, further comprises:
selecting, at the current root node, the new root node from at least one of the candidate root nodes and the current root node based on the primary factors associated with each particular candidate root node and the primary factors associated with the current root node.

23. A method according to claim 22, wherein selecting, at the current root node, the new root node from at least one of the candidate root nodes and the current root node based on the primary factors associated with each candidate root node and the primary factors associated with the current root node, further comprises:
comparing, at the current root node, primary factors associated with each of the candidate root nodes; and
attempting to select, at the current root node, a new root node based on a result of comparing the primary factors associated with each of the candidate root nodes.

24. A method according to claim 23, wherein the primary factors comprise: whether the candidate root nodes are designated as at least one of the candidate root nodes with a priority of being selected as the new root node, the candidate root nodes that are powered ON, or the candidate nodes that are fixed, and further comprising:
determining whether the number of the candidate root nodes with the priority of being selected as the new root node is greater than, less than or equal to one;
determining a first number of the candidate root nodes that are powered ON, when the number of nominee root nodes with the priority of being selected as the new root node is zero or more than one; and
determining a second number of the candidate root nodes that are fixed, when the number of the candidate root nodes that are powered ON is zero or more than one.

25. A method according to claim 24, further comprising:
removing the candidate root nodes other than the candidate root nodes with the priority of being selected as the new root node from consideration when the number of the candidate root nodes with the priority of being selected as the new root node is greater than one,
removing the candidate root nodes other than the candidate root nodes that are powered ON from consideration, when the number of the candidate root nodes that are powered ON is greater than one, and
removing the candidate root nodes other than the candidate root nodes that are fixed from consideration, when the number of the candidate root nodes that are fixed is greater than one.

26. A method according to claim 25, further comprising:
selecting the candidate root node with the priority of being selected as the new root node as the new root node, when the number of the candidate root nodes with the priority of being selected as the new root node is equal to one, selecting the candidate root node that are powered ON as the new root node, when the number of the candidate root nodes that are powered ON is equal to one, and selecting the candidate root node that are fixed as the new root node, when the number of the candidate root nodes that are fixed is equal to one.

27. A method according to claim 26, wherein each of the first status message further comprises at least one of a number of secondary factors associated with a corresponding candidate root node regarding capabilities of the corresponding candidate root node, wherein the secondary factors comprise at least one of:

(a) proximity of a corresponding candidate root node to infrastructure, (b) proximity quality of the corresponding candidate root node to the infrastructure, (c) stability of the corresponding candidate root node based on the number of route changes per unit time, (d) node battery level of the corresponding candidate root node which indicates the amount of power the corresponding candidate root node has remaining, (e) path battery level for the corresponding candidate root node and intervening nodes between the corresponding candidate root node and the infrastructure, (f) average cost to all other nodes, and (g) number of neighbor nodes, and further comprising:

selecting a new root node based on at least one secondary factor associated with each candidate root node when the current root node is unable to select the new root node based on the primary factors associated with each candidate root node.

28. A method according to claim 27, wherein, when the current root node is unable to select the new root node based on the primary factors associated with each candidate root node, further comprising:

determining a weighted metric for each of the candidate root node that is powered OFF, mobile and is without a priority of being selected as the new root node based on an aggregate weighted value of secondary factors associated with each candidate root node, and determining which candidate root node among the candidate root nodes that are powered OFF, mobile and are without a priority of being selected as the new root node has the highest weighted metric, and selecting the candidate root node that is powered OFF, mobile and is without a priority of being selected as the new root node and have the highest weighted metric as the new root node.

* * * * *

UNITED STATES PATENT AND TRADEMARK OFFICE
CERTIFICATE OF CORRECTION

| | |
|---|---|
| PATENT NO. | : 7,876,706 B2 |
| APPLICATION NO. | : 11/363757 |
| DATED | : January 25, 2011 |
| INVENTOR(S) | : Ekl et al. |

It is certified that error appears in the above-identified patent and that said Letters Patent is hereby corrected as shown below:

ON THE TITLE PAGE

1. On the Title Page, in Field (56), under "U.S. PATENT DOCUMENTS", in Column 1, Line 2, delete "6,134,599 A 10/2000 Chiu" and insert -- 6,134,599 A 10/2000 Chiu et al. 709/252 --, therefor.

2. On the Title Page, in Field (57), under "ABSTRACT", in Column 2, Line 2, delete "comprising" and insert -- in which --, therefor.

3. On the Title Page, in Field (57), under "ABSTRACT", in Column 2, Line 3, delete "node." and insert -- node operate. --, therefor.

IN THE DRAWINGS

4. In Fig. 2, Sheet 2 of 8, delete "2200" and insert -- 220O --, therefor.

5. In Fig. 3, Sheet 3 of 8, delete "2200" and insert -- 220O --, therefor.

6. In Fig. 5, Sheet 5 of 8, for Tag "544", in Line 1, delete "PROMIXITY" and insert -- PROXIMITY --, therefor.

IN THE SPECIFICATION

7. In Column 1, Line 3, below Title, insert
-- RELATED APPLICATIONS
The present application is related to the following U.S. application commonly owned with this application by Motorola, Inc.: Patent Application Serial No. 11/363,756, filed February 28, 2006, titled "Method and Apparatus for Myopic Root Node Selection in an Ad Hoc Network", now US Patent Application Publication Number US20070204021 A1; and Patent Application Serial No. 11/363,778, filed February 28, 2006, titled "Method and Apparatus for Omniscient Root Node Signed and Sealed this
Eleventh Day of October, 2011

David J. Kappos
*Director of the United States Patent and Trademark Office*

Selection in an Ad Hoc Network", now US Patent Application Publication Number US20070201382 A1, the entire contents of each being incorporated herein by reference. --.

IN THE CLAIMS

8. In Column 23, Line 3, in Claim 6, delete "4," and insert -- 5, --, therefor.

9. In Column 23, Line 17, in Claim 8, delete "4," and insert -- 7, --, therefor.

10. In Column 25, Line 29, in Claim 19, delete "its;" and insert -- its status information; --, therefor.

11. In Column 26, Line 65, in Claim 26, after "selected" delete "as the new root node".